J. L. MATHEWS.
HAY-LOADER.
No. 180,900. Patented Aug. 8, 1876.
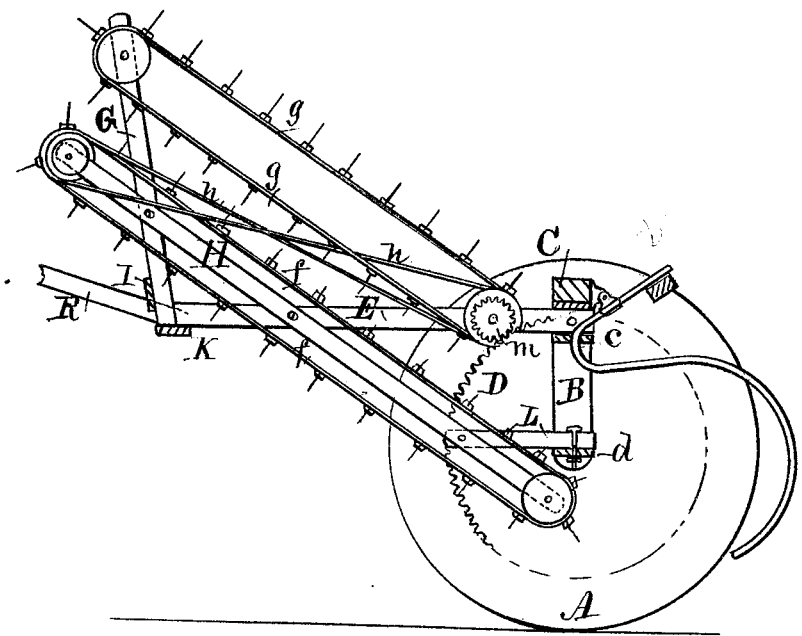

UNITED STATES PATENT OFFICE.

JOHN L. MATHEWS, OF GRINNELL, IOWA.

IMPROVEMENT IN HAY-LOADERS.

Specification forming part of Letters Patent No. 180,900, dated August 8, 1876; application filed March 22, 1876.

*To all whom it may concern:*

Be it known that I, JOHN L. MATHEWS, of Grinnell, in the county of Powesheik and State of Iowa, have invented an Improved Hay-Raking and Elevating Apparatus, of which the following is a specification:

The object of my invention is to construct and combine an elevator and a rake that can be used independently in such a manner that they can be jointly attached to a wagon, to automatically gather, elevate, pack, and load hay.

It consists, first, in forming and adapting the rake-frame to alternately receive the thills and the elevator; second, in mounting two endless carriers of unequal length on a detachable frame, that is formed and adapted to be combined with a rake and a wagon, all as hereinafter fully set forth.

My drawing is a sectional elevation and plan view illustrating the construction, application, and operation of my complete apparatus. A is one of the carriage-wheels of the rake. B is one of the side pieces of the rake-frame, at the lower end of which short axles stand outward to receive the carriage-wheels A. C is a cross-piece rigidly connected with the top ends of the side pieces B, and together they form the rake-frame. *a* represents a series of rake-teeth connected with and carried by the rake-head *b*, and hinged to the elevated axle or cross-piece C in any suitable manner, so that the rake can be operated underneath and in rear, as required, in gathering hay. D is a gear-wheel, rigidly fixed to the inside of the carriage-wheel A. *c* is a branch or box integral with the cast-metal side piece B, at its top and inside, for the purpose of alternately receiving and securing the frame of the elevator and the thills of the rake. *d* is a corresponding branch or box on the inside and lower end of the side piece B, designed to alternately receive and secure the thills and a pivoted brace carried by the elevator. E G H I K represent the frame of the elevator. E is the base-piece in a horizontal position. Its rear end is fitted and bolted to the plate or box *c* on the side piece B of the rake-frame. G is an upright, inclining forward and rigidly framed to the front end of the base-piece E. H is a side piece and pulley-bearer, rigidly attached to the pieces E G, in such a manner as to form a corner-brace to them and to extend downward at an angle of about thirty-six degrees. I and K are cross-pieces connecting the two equal sides of the elevator-frame.

L is a brace pivoted to the pulley-bearer H and bolted to the branch *d* on the side piece B of the rake-frame. *ff* is an endless carrier, supported by the side pieces H, and in the same plane and angle. *gg* is an endless carrier running parallel with the carrier *ff*. It has its upper bearings in the top end of the uprights G, and its lower bearings in the rear portion of the base-piece E. *m* is a pinion on the end of the shaft and roller that supports and moves the carrier *gg* at its lower end. It engages the driving-wheel B on the inside of the carriage-wheel A. *nn* is a crossed belt that communicates power from a pulley on the rear side of the pinion *m* to actuate the carrier *ff* in such a manner that the two carriers will co-operate in taking the hay from the rake and carrying it upward. R is an arm attached to and extending forward from the cross-pieces I and K of the elevator-frame. It has a hook at its end adapted for coupling the complete apparatus to the rear end of a wagon.

In the practical operation of my invention, when it is used to gather, elevate, pack, and load hay, the rake shafts or thills are removed from the rake and the elevator attached in the same place. The combined rake and elevator is then coupled to a wagon. The driving-wheels D on the carriage-wheels A operate the pinions *m*, and thereby actuate the carriers *ff* and *gg*. In working the hay upward between the two carriers it becomes packed and better prepared to form a compact load on the wagon than when elevated upon a single carrier. The second and upper carrier also forms a shield to prevent the wind from lifting and scattering the hay, and will thus be greatly advantageous.

To use the rake independently the elevator is removed and the thills put in place, as indicated by the figure in broken lines. The branches *c* and *d* on the side pieces B are as well adapted for receiving the thills and a pivoted brace carried thereby as for the elevator and its pivoted braces L. But the thill-braces curve outward and incline upward to reach the branches or boxes c, where they are secured by the same bolts used to fasten the base-pieces E of the elevator.

I claim as my invention—

1. In a hay gathering and elevating apparatus, the parallel carriers and elevators $ff$ $gg$, arranged and combined with the detachable frame E G H I K, substantially as and for the purposes shown and described.

2. The elevator-frame E G H I K, supporting the carriers $ff$ and $gg$, arranged and combined with the rake-carriage A B C, by means of the branches or boxes $cd$ and the pivoted braces L, substantially as and for the purposes specified.

3. The rake-frame B C, having the branches $cd$, adapted to alternately secure the thills and the elevator, substantially as and for the purposes shown and described.

4. The rake-carriage A B C, having the driving-wheels D D and branches $cd$, in combination with the detachable frame E G H, carrying the elevators $ffgg$, pinions $m$, and cross-belts $nn$, substantially as and for the purposes shown and described.

JOHN L. MATHEWS.

Witnesses:
HENRY C. SPENCER,
GEO. H. HAMLIN.